(12) United States Patent
Gideons

(10) Patent No.: US 7,739,435 B2
(45) Date of Patent: Jun. 15, 2010

(54) SYSTEM AND METHOD FOR ENHANCING I2C BUS DATA RATE

(75) Inventor: Michael D. Gideons, Sachse, TX (US)

(73) Assignee: Texas Instruments Incorporated, Dallas, TX (US)

( * ) Notice: Subject to any disclaimer, the term of this patent is extended or adjusted under 35 U.S.C. 154(b) by 11 days.

(21) Appl. No.: 11/752,363

(22) Filed: May 23, 2007

(65) Prior Publication Data

US 2008/0162758 A1 Jul. 3, 2008

Related U.S. Application Data

(60) Provisional application No. 60/882,763, filed on Dec. 29, 2006.

(51) Int. Cl.
*G06F 13/42* (2006.01)
*G06F 13/00* (2006.01)
(52) U.S. Cl. ...................... 710/105; 710/110
(58) Field of Classification Search .............. 710/105, 710/110
See application file for complete search history.

(56) References Cited

U.S. PATENT DOCUMENTS

| 4,851,992 | A | * | 7/1989 | Nakayama ............... 718/108 |
| 5,506,965 | A | * | 4/1996 | Naoe ..................... 709/209 |
| 7,231,467 | B2 | * | 6/2007 | Baker et al. ................. 710/9 |
| 7,493,433 | B2 | * | 2/2009 | Behrendt et al. ........... 710/110 |
| 2003/0126413 | A1 | * | 7/2003 | El-Kik et al. ............. 712/225 |
| 2004/0153726 | A1 | * | 8/2004 | Suzuki ..................... 714/6 |
| 2005/0165989 | A1 | * | 7/2005 | Kim ....................... 710/260 |
| 2006/0200605 | A1 | * | 9/2006 | Hatamori ................. 710/110 |
| 2007/0088874 | A1 | * | 4/2007 | Brabant ..................... 710/62 |
| 2008/0195783 | A1 | * | 8/2008 | Deshpande ............... 710/110 |
| 2008/0215780 | A1 | * | 9/2008 | Deshpande et al. ......... 710/110 |

OTHER PUBLICATIONS

Michael D. Gideons, "System and Method for Enhancing I2C Bus Data Rate" U.S. Appl. No. 60/822,763, Filed Dec. 29, 2006.

* cited by examiner

*Primary Examiner*—Mark Rinehart
*Assistant Examiner*—Christopher A Daley
(74) *Attorney, Agent, or Firm*—Wade J. Brady, III; Frederick J. Telecky, Jr.

(57) ABSTRACT

A system for, and method of, enhancing I2C bus data rate and an electronic assembly including the system or the method. In one embodiment, the system includes: (1) a modulus register associable with a slave device and configured to contain a modulus and (2) data transfer logic associated with the modulus register and configured to transfer data from at least one memory location in the slave device to the I2C bus based on the modulus and a starting address and at least one acknowledgement signal received via the I2C bus.

12 Claims, 4 Drawing Sheets

SYSTEM AND METHOD FOR ENHANCING
I2C BUS DATA RATE

CROSS-REFERENCE TO PROVISIONAL APPLICATION

This application claims the benefit of U.S. Provisional Application No. 60/882,763 entitled "System and Method for Enhancing I2C Bus Data Rate" to Michael D. Gideons, filed on Dec. 29, 2006 which is commonly assigned with the present invention and incorporated herein by reference as if reproduced herein in its entirety.

TECHNICAL FIELD OF THE INVENTION

The invention is directed, in general, to the Inter-Integrated Circuit (abbreviated "I2C") bus and, more particularly, to a system and method for enhancing I2C bus data rate.

BACKGROUND OF THE INVENTION

Peripheral integrated circuits (ICs) are often connected to a central processing unit (CPU) as memory-mapped input/output (I/O) devices using a parallel bus for each of address and data. Unfortunately, routing parallel buses, along with required address decoders and other interface logic, on a printed circuit board (PCB) results in a complex and expensive PCB, which is not viable in mass-produced products such as television sets, video cassette recorders and audio equipment. In these products, every PCB that can be simplified and every component that can be omitted results in increased profitability for the manufacturer and more affordable products for the customer. In addition to the problems of cost and complexity, the greater numbers of wires that constitute a parallel bus renders the CPU and peripheral devices more susceptible to disturbances by electromagnetic interference (EMI) and electrostatic discharge (ESD).

To address these problems, Philips Semiconductor developed the I2C bus in the early 1980s to provide a less expensive and simpler way to transfer data between or among a CPU, such as a microcontroller, and one or more peripheral devices. Rather than being a parallel bus, the I2C bus is a serial bus having only two wires (assuming a common ground among CPU and peripheral devices). One wire, called "SCL," bears a clock signal; the other wire, called "SDA," bears the data. Data is transferred among a "master device" (typically the CPU) and various slave devices (typically the peripheral devices) in a "transaction" that consists of a "start condition," a preamble, the data, a "stop condition" and various acknowledgement signals. A transaction in which data is read from a peripheral device is called "reading;" a transaction in which data is written to a peripheral device is called "writing." A single I2C serial bus can replace both address and data parallel buses. Today, the I2C bus is used in many applications other than just audio and video equipment. Industry has accepted the I2C bus as a de facto standard.

Although I2C buses are flexible and inexpensive, each data transfer transaction necessarily involves a delay (expressed in terms of clock cycles) for transferring the preamble. For example, the preamble for reading data requires 29 clock cycles. This delay is properly characterized as overhead and limits the rate at which data can be transferred over an I2C bus. For example, if a given transaction calls involves the reading of 8 bits of data, almost 75% of the bandwidth of the bus is occupied with overhead.

This bus data rate limit is particularly disadvantageous in the context of production testing, when data is often required to be read from one or a relatively small group of addresses many times over in order to test equipment before it is shipped. Because the transfer is repeated, the 18 or 29 clock-cycle overhead is incurred over and over again, compounding it into a significant delay. As a result, tests may not be performed as often or thoroughly as desired. Other tests may not be possible at all given the limited data rate.

Accordingly, what is needed in the art is a way to enhance the data rate of an I2C bus. What is further needed in the art is a way to decrease the amount of overhead incurred in repeated transfers involving one or more addresses.

SUMMARY OF THE INVENTION

To address the above-discussed deficiencies of the prior art, the invention provides, in one aspect, a system for enhancing I2C bus data rate. In one embodiment, the system includes: (1) a modulus register associable with a slave device and configured to contain a modulus and (2) data transfer logic associated with the modulus register and configured to transfer data from at least one memory location in the slave device to the I2C bus based on the modulus and a starting address and at least one acknowledgement signal received via the I2C bus.

Another aspect of the invention provides a method of enhancing I2C bus data rate. In one embodiment, the method includes: (1) receiving a start condition from a master device into a slave device, (2) receiving a starting address from the master device into the slave device, (3) receiving at least one acknowledgement signal via the I2C bus and (4) transferring data from at least one memory location in the slave device to the I2C bus based on a modulus, the starting address and the at least one acknowledgement signal.

Yet another aspect of the invention provides an electronic assembly. In one embodiment, the electronic assembly includes: (1) a master device, (2) a plurality of slave devices and (3) an I2C bus interconnecting the master device and the plurality of slave devices. At least one of the slave devices has a system for enhancing I2C bus data rate, including: (1) a modulus register associable with the slave device and configured to contain a modulus and (2) data transfer logic associated with the modulus register and configured to transfer data from at least one memory location in the slave device to the I2C bus based on the modulus and a starting address and at least one acknowledgement signal received from the master device.

The foregoing has outlined preferred and alternative features of the invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
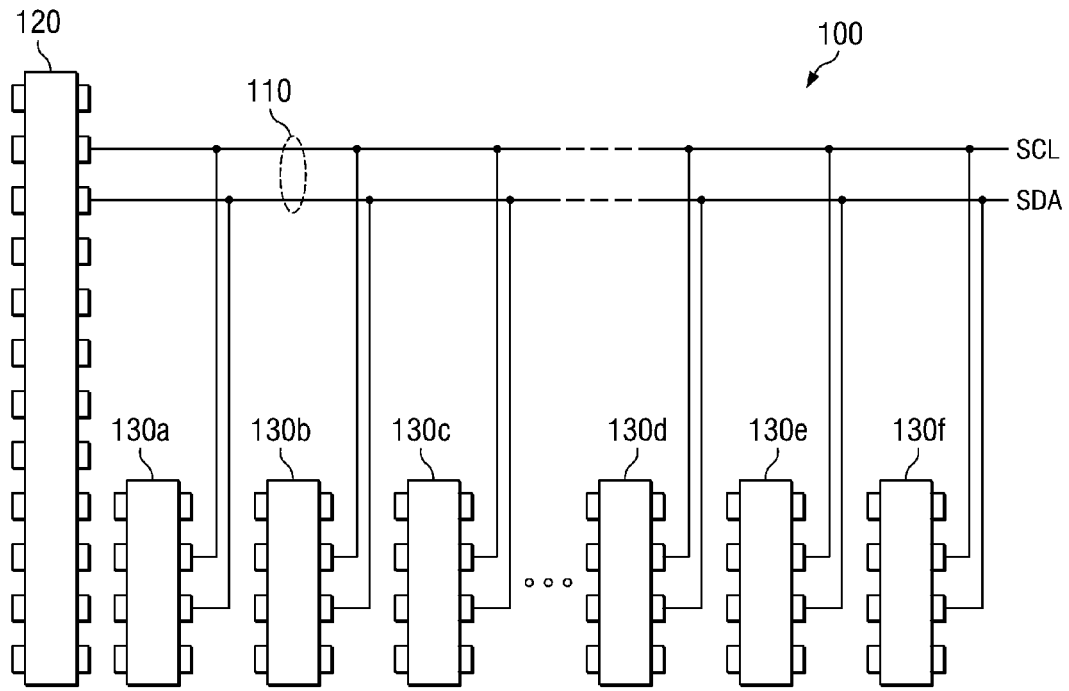
FIG. 1 is a block diagram illustrating one embodiment of an electronic assembly containing master and slave devices interconnected with an I2C bus to effect transfers of data thereamong.

FIG. 1 is a block diagram illustrating one embodiment of an electronic assembly, generally designated 100. An I2C bus 110 serves to interconnect electronic devices in the electronic assembly 100. The I2C bus 110 has a first wire, called "SCL," that bears a clock signal and a second wire, called "SDA," that bears data.

A master device 120 is coupled to the I2C bus 110. The master device 120 is illustrated as being a CPU, but may be any device appropriate to a particular application for the electronic assembly 100. The master device 120 need not be a dual inline package (DIP); it may take any physical form. As those skilled in the art understand, the master device 120 controls the I2C bus 110 and therefore directs communication over the I2C bus.

Various slave devices 130a, 130b, 130c, 130d, 130e, 130f are likewise coupled to the I2C bus 110. The slave devices 130a, 130b, 130c, 130d, 130e, 130f may be any number of single or multiple types of device appropriate to a particular application for the electronic assembly 100. The slave devices 130a, 130b, 130c, 130d, 130e, 130f need not be DIPs; they may take any physical form. So interconnected, the master device 120 may effect transfers of data between itself and any one or more of the slave devices 130a, 130b, 130c, 130d, 130e, 130f. Each device coupled to the I2C bus has a unique slave address. The master device 120 determines the source or destination of each data transfer by specifying the slave address of the slave device (e.g., 130a, 130b, 130c, 130d, 130e, 130f) with which the master device 120 is communicating data. The transfer may involve transferring data from a slave device (a read) or to a slave device (a write).

As described above, transactions involving the transfer of relatively small amounts of data incur relatively high overhead as a result of preambles that the I2C bus 110 requires. This relatively high overhead limits the data rate of the I2C bus. To enhance the data rate, at least one of the slave devices 130a, 130b, 130c, 130d, 130e, 130f includes a system for enhancing I2C bus data rate. Various embodiments of that system will now be described.

Figure 2:
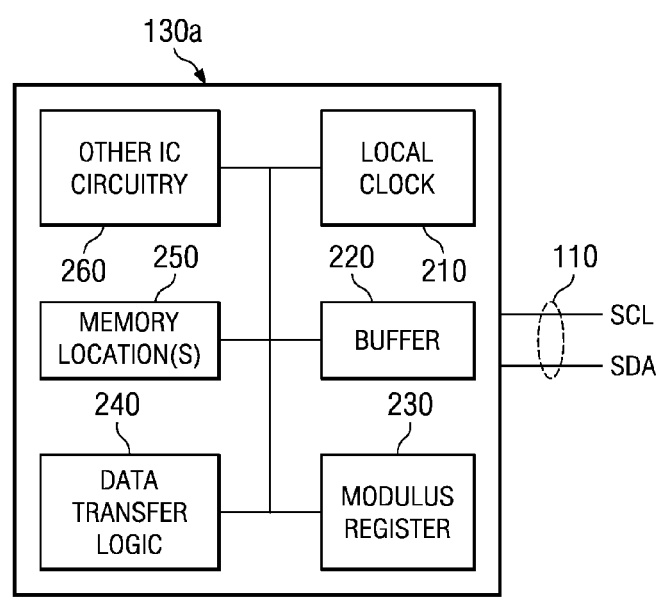
FIG. 2 is a block diagram illustrating one embodiment of a slave device of FIG. 1 containing a system for enhancing I2C bus data rate.

FIG. 2 is a block diagram illustrating one embodiment of a slave device (e.g., the slave device 130a) containing a system for enhancing I2C bus data rate. As is shown, the slave device 130a has a local clock 210 and a serializing/deserializing buffer 220 respectively coupled to the SCL and SDA wires of the I2C bus. Those skilled in the pertinent art understand the structure and function of the local clock 210 and the buffer 220.

A modulus register 230 is associated with the slave device 130a. The illustrated embodiment of the modulus register 230 is configured to contain a modulus. In one embodiment, the modulus is received via the I2C bus. In an alternative embodiment, the modulus is pre-loaded into the modulus register or received from outside the slave device 130a by some means (not shown) other than the I2C bus. In one embodiment, the modulus register 230 shares a slave address with the remainder of the slave device 130a; that is, both the modulus register 230 and the slave device 130a have the same slave address. In this embodiment, the modulus is typically received via the I2C bus before the starting address is received via the I2C bus. In an alternative embodiment, the modulus register 230 has a slave address that is different from that of the slave device 130a.

Data transfer logic 240 is also associated with the slave device 130a and the modulus register 230. The illustrated embodiment of the data transfer logic 240 is configured to transfer data between at least one memory location in the slave device 130a and the I2C bus 110 based on the modulus contained in the modulus register 230 and a starting address and at least one acknowledgement signal (e.g., an acknowledgement, or "Ack," signal or a not-acknowledgement, or "NAck," signal) received via the I2C bus 110. One method by which such data transfer may take place will be illustrated in FIGS. 3A and 3B, below.

One or more memory locations 250 may also be associated with the slave device 130a. The one or more memory locations 250 are capable of containing data that may be read from the slave device 130a. In one embodiment, the data transfer logic 240 employs the modulus register 230 to advantage to increase the rate at which data may be read from the one or more memory locations 250.

Other IC circuitry 260 is typically associated with the slave device 130a. The other IC circuitry 260 may be the subject of production testing, during which the one or more other registers receive or provide data demonstrating the correct or incorrect operation of the other IC circuitry 260. The data transfer circuitry 240 and the modulus contained in the modulus register 230 may be employed, for example, to increase the speed and effectiveness of the production testing.

Having described some portions of a representative slave device, an example of a transaction performed in accordance with the invention, involving the repeated reading of one or more target memory locations, can now be described.

Before the example transaction can take place, the modulus register 230 should contain a modulus. The modulus register 230 may be nonvolatile memory, in which case the modulus is persistently stored in the modulus register 230. Alternatively, the modulus may be written to the modulus register 230 in a separate transaction.

In the latter case, the modulus register 230 may share a common slave address with the slave device 130a. Alternatively, the modulus register 230 may have a slave address that differs from the slave device. In either case, modulus is written to the modulus register 230 in a transaction that precedes the example transaction.

The data transfer logic 240 makes use of the modulus register and various acknowledgement signals received from the master device to effect the repeated transfer. The data transfer logic 240 steps (increments or decrements) through the single address or range of addresses using the modulus to govern the incrementing or decrementing (hence the repeating). In one embodiment, if the modulus is one (a nonzero positive integer modulus), a single memory location is the subject of the repeated transfer. In another embodiment, if the modulus exceeds one (still a nonzero positive integer modulus), a closed-ended group of plural memory locations is the subject of the repeated transfer. In yet another embodiment, if the modulus is zero, no modulus applies, and the range of memory locations involved in the transfer is open-ended and therefore depends upon the acknowledgement signals. Still another embodiment accommodates all three of these embodiments.

Assuming that the modulus is already contained in the modulus register 230, a master device (e.g., the master device 120 of FIG. 1) begins the example transaction by transmitting a start condition on the I2C bus 110. The master device then begins to send a preamble by transmitting a sequence of bits over the I2C bus representing the slave address of a particular slave device (the slave device 130a in this example) plus the write bit. The slave address is received into the buffer 220 and recognized as being the address of the slave device 130a. In response, the slave device 130a transmits an acknowledgement signal (Ack) over the I2C bus 110. The master device receives the acknowledgement signal and then transmits the address of the one of the memory locations 250 in the slave device 130a from which the data is to be read. The address is received into the buffer 220. In response, the slave device 130a transmits an acknowledgement. The master device receives the acknowledgement signal and then transmits either a) a stop condition followed by a start condition or b) a restart condition. The master device then sends the same sequence of bits over the I2C bus representing the slave address of the slave device 130a plus the read bit. The slave address is received into the buffer 220 and recognized as being the address of the slave device 130a. In response, the slave device 130a transmits an acknowledgement signal (Ack) over the I2C bus 110. The preamble has now been sent, and data transmission can begin.

The data transfer logic 240 employs the address to retrieve the data from, e.g., one of the memory locations 250 and place the data in the buffer 220. The buffer 220 then causes the data to be transmitted over the I2C bus 110. The master device receives the data and transmits either an Ack signal to indicate that more data is needed or a NAck signal and a stop condition to indicate that the data transfer and transaction are to end. If the master device sends an Ack signal, the data transfer logic 240 causes more data to be transmitted over the I2C bus. There is no theoretical limit to the number of data transfers that can occur in a single transaction; the data transfer process can continue as long as desired.

Figure 3A:
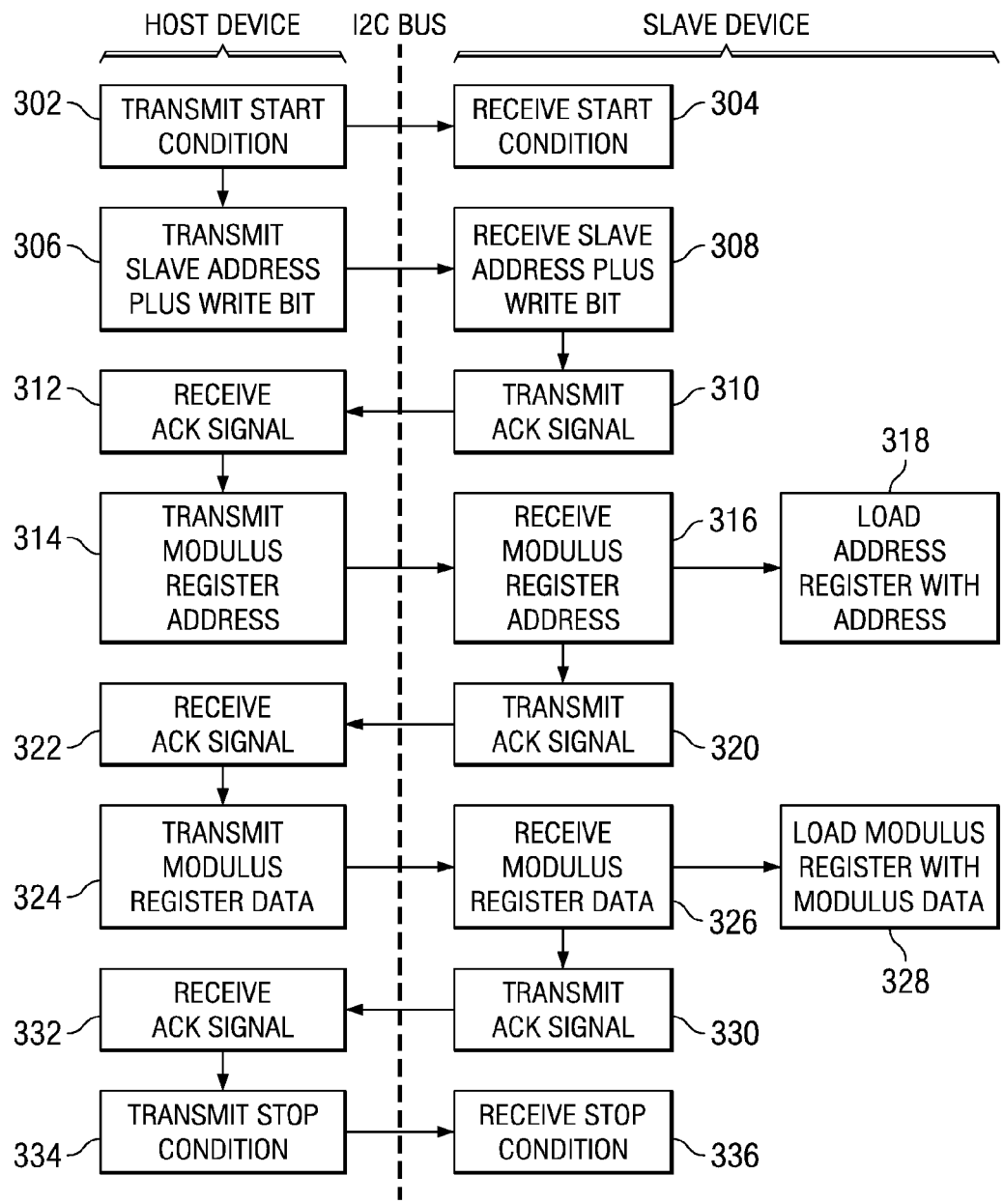
FIG. 3A is a diagram illustrating one embodiment of a method by which a modulus may be provided to a modulus register in a slave device, such as the slave device of FIG. 2, carried out according to the principles of the invention.

FIG. 3A is a diagram illustrating one embodiment of a method by which a modulus may be provided to a modulus register in a slave device, such as the slave device of FIG. 2, carried out according to the principles of the invention. Of course, the modulus register may contain the modulus, making the method of FIG. 3A unnecessary.

In a step 302, the host device transmits a start condition over the I2C bus. In a step 304, the slave devices, including the slave device with which the transaction is to take place (i.e., the slave device with which the modulus register is associated), receive the start condition. In a step 306, the host device transmits the slave address of the slave device with which the modulus register is associated as well as the write bit. The slave address associated with the modulus register may be the same as, or different from, the slave address of the slave device with which data will later be repeatedly transferred. In a step 308, the slave device associated with the modulus register receives the slave address and write bit. In a step 310, the slave device associated with the modulus register acknowledges its presence by transmitting an Ack signal over the I2C bus. In a step 312, the host device receives the Ack signal. In a step 314, the host device transmits the address of the modulus register. In a step 316, the slave device receives the address of the modulus register and, in a step 318 causes the received address to be loaded into the address register. In a step 320, the slave device acknowledges the receipt of the address and transmits an Ack signal over the I2C bus. In a step 322, the host device receives the Ack signal. In a step 324, the host device transmits a modulus over the I2C bus. In a step 326, the slave device receives the modulus and, in a step 328, causes the modulus to be loaded into the modulus register. In a step 330, the slave device acknowledges the receipt of the modulus and transmits an Ack signal over the I2C bus. In a step 332, the host device receives the Ack signal. Having transmitted received the modulus Ack signal, in a step 334, the host device transmits a stop condition over the I2C bus.

The slave device receives the stop condition in a step 336. The transaction by which the host device provided the modulus to the modulus register is complete. Now, a transaction may take place by which data is repeatedly read from a slave device. However, that transaction need not immediately follow the transaction of FIG. 3A.

Figure 3B:
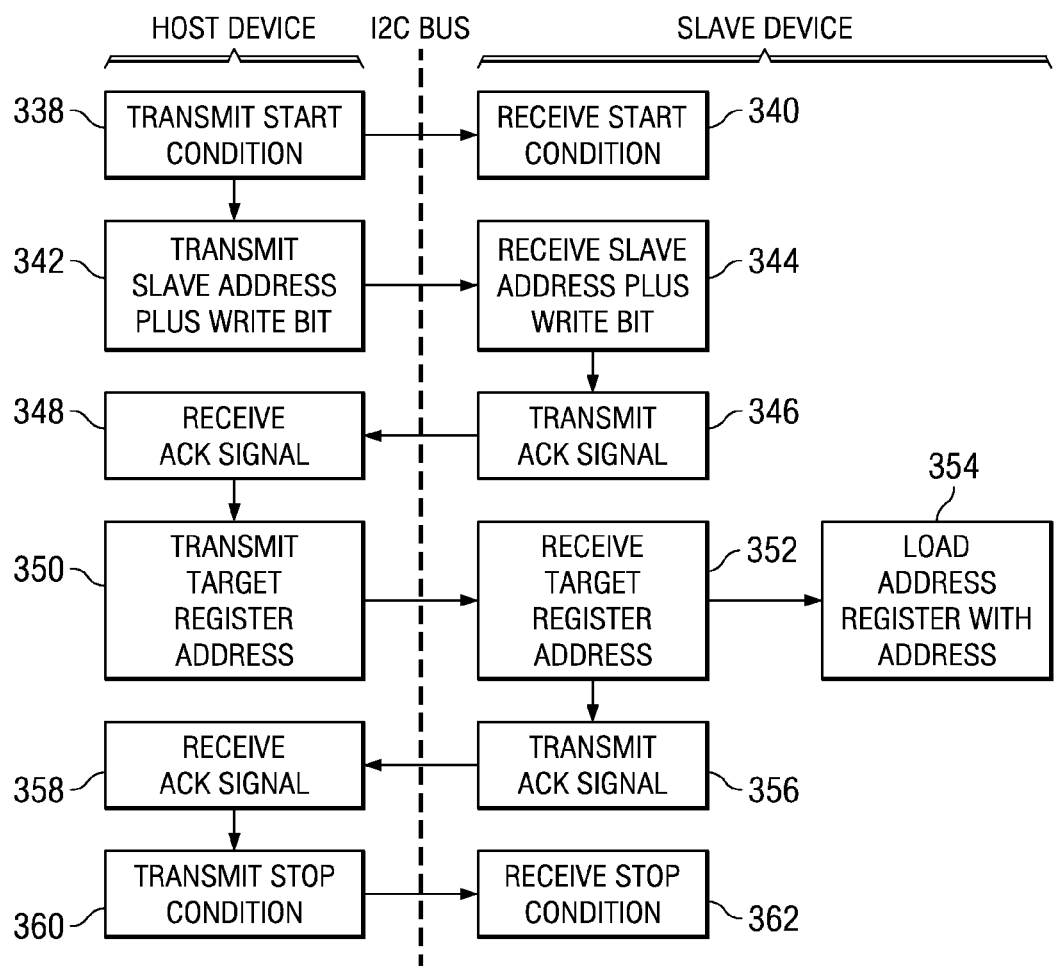
FIG. 3B is a block diagram illustrating one embodiment of a first portion of a method by which data may be repeatedly read from one or more addresses in a slave device, such as the slave device of FIG. 2, carried out according to the principles of the invention.
Figure 3C:
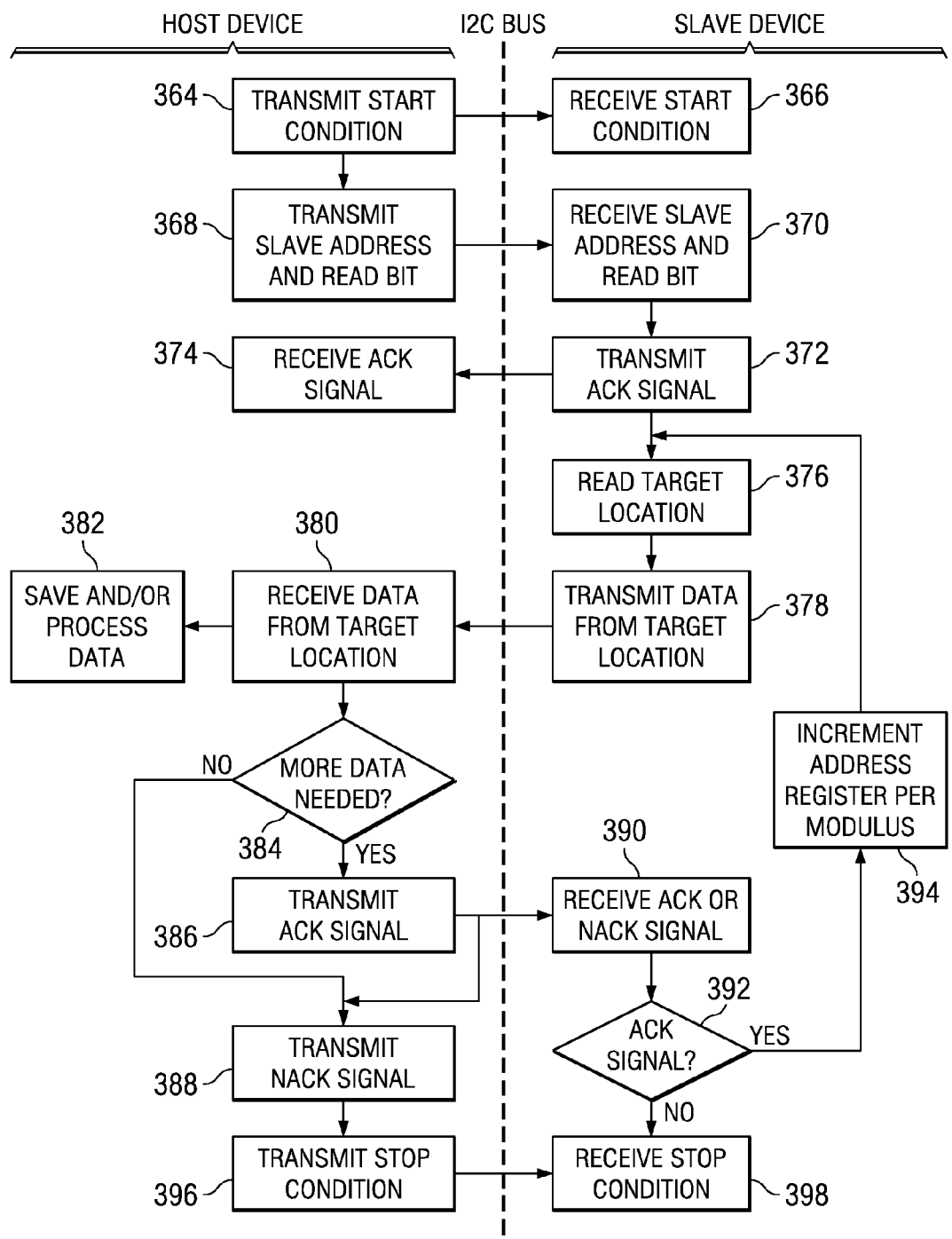
FIG. 3C is a block diagram illustrating one embodiment of a second portion of a method by which data may be repeatedly read from one or more addresses in a slave device, such as the slave device of FIG. 2, carried out according to the principles of the invention.

FIGS. 3B and 3C are diagrams together illustrating one embodiment of a method by which data may be repeatedly read from one or more addresses in a slave device, such as the slave device of FIG. 2, carried out according to the principles of the invention.

In a step 338, the host device transmits a start condition over the I2C bus. In a step 340, the slave devices, including the slave device with which the transaction (the data transfer) is to take place, receive the start condition. In a step 342, the host device transmits the slave address of the slave device with which the repeated data transfer (i.e., read) is to take place and the write bit. In a step 344, the slave device which the read is to take place receives the slave address. In a step 346, the slave device acknowledges its presence by transmitting an Ack signal over the I2C bus. In a step 348, the host device receives the Ack signal. In a step 350, the host device transmits an address. The address may be the address of a single location in the slave device from which data is to be repeatedly read. The address may be the starting address of a range of locations in the slave device from which data is to be repeatedly read. The address may be related in any way to the range of addresses without departing from the scope of the invention.

In a step 352, the slave device receives the address and, in a step 354, causes the address to be loaded into an address register. In a step 356 the slave device acknowledges receipt of the address and transmits an Ack signal. In a step 358, the master device receives the Ack signal and, in a step 360 transmits a stop condition. In a step 362, the slave device receives the stop condition.

In a step 364, the host device transmits a start condition over the I2C bus. In a step 366, the slave devices, including the slave device with which the transaction (the data transfer) is to take place, receive the start condition. In lieu of steps 360 and 364, the master could have sent a single restart command. In a step 368, the host device transmits the slave address of the slave device with which the repeated data transfer (i.e., read) is to take place and the read bit. In a step 370, the slave device which the read is to take place receives the slave address and read bit. In a step 372, the slave device acknowledges its presence by transmitting an Ack signal over the I2C bus. In a step 374, the host device receives the Ack signal. In a step 364, the slave device receives the address and, in a step 354, causes the address to be loaded into an address register. In a step 376, the data transfer logic reads the target memory location based on the address contained in the address register. In a step 378, the data transfer logic causes the data read from the target memory location to be transferred to the I2C bus. In a step 380, the master device receives the data from the target memory location via the I2C bus. In a step 382, the master device causes the data to be saved or processed as a particular application (e.g., a production test) may require. In a decisional step 384, the master device determines whether more data is needed to be read. If YES, the master device transmits an Ack signal to the slave device via the I2C bus in a step 386. If NO, the master device instead transmits a NAck signal in a step 388, followed by a stop condition in a step 396.

The slave device receives the Ack or the NAck signal in a step 390. The data transfer logic then determines whether or not the signal is an Ack or a NAck signal in a decisional step 392. In the embodiment of FIGS. 3B and 3C, if the signal is an Ack signal (YES), the data transfer logic causes the address stored in the address register to increment in a decisional step 394 such that it points to the next location from which data is to be read. However, the address increments subject to the modulus. The modulus may cause the address to loop back to the start of the range. This is certainly the case when the modulus defines a range of only one location. If the signal is an Ack signal (YES), the data transfer logic again reads the target memory location based on the address contained in the address register in the step 376 and proceeds with further reads. If the signal is a NAck signal (NO), the data transfer logic does not so proceed and ostensibly, but not necessarily, waits to receive the stop condition from the master device in a step 398.

Although the invention has been described in detail, those skilled in the pertinent art should understand that they can make various changes, substitutions and alterations herein without departing from the scope of the invention in its broadest form.

What is claimed is:

1. A system for enhancing I2C bus data rate, comprising:
   a modulus register associable with a slave device and configured to contain a modulus; and
   data transfer logic associated with said modulus register and configured to transfer data from at least one memory location in said slave device to said I2C bus based on said modulus and a starting address and at least one acknowledgement signal received via said I2C bus;
   wherein a nonzero positive integer modulus defines the number of memory locations in a closed-ended range of memory locations, said starting address defines a starting address for said close-ended range and said data transfer logic repeatedly loops through memory locations in said closed-ended range to transfer data from each of the memory locations in said closed-ended range to said I2C bus a plurality of times based on said at least one acknowledgement signal and wherein a modulus of zero defines an open-ended range of memory locations, said starting address defines a starting address for said open-ended range and said data transfer logic transfers data from each of the memory locations in said open-ended range to said I2C bus only a single time based on said at least one acknowledgement signal.

2. The system as recited in claim 1 wherein said modulus is received via said I2C bus.

3. The system as recited in claim 2 wherein said modulus is received via said I2C bus before said starting address is received via said I2C bus.

4. The system as recited in claim 1 wherein said modulus register shares a common slave address with said slave device.

5. A method of enhancing I2C bus data rate, comprising:
   receiving a start condition from a master device into a slave device;
   receiving a starting address from said master device into said slave device;
   receiving at least one acknowledgement signal via said I2C bus; and
   transferring data from at least one memory location in said slave device to said I2C bus based on a modulus stored in a modulus register of said slave device, said starting address and said at least one acknowledgement signal;
   wherein a nonzero positive integer modulus defines the number of memory locations in a closed-ended range of memory locations, said starting address defines a starting address for said close-ended range and said data transfer logic repeatedly loops through memory locations in said closed-ended range to transfer data from each of the memory locations in said closed-ended range to said I2C bus a plurality of times based on said at least one acknowledgement signal and wherein a modulus of zero defines an open-ended range of memory locations, said starting address defines a starting address for said open-ended range and said data transfer logic transfers data from each of the memory locations in said open-ended range to said I2C bus only a single time based on said at least one acknowledgement signal.

6. The method as recited in claim 5 further comprising receiving said modulus via said I2C bus.

7. The method as recited in claim 6 wherein said receiving said modulus is carried out before said receiving said starting address.

8. The method as recited in claim 5 wherein said modulus register shares a common slave address with said slave device.

9. An electronic assembly, comprising:
   a master device;
   a plurality of slave devices; and
   an I2C bus interconnecting said master device and said plurality of slave devices, at least one of said slave devices having a system for enhancing I2C bus data rate, including:
      a modulus register associable with said slave device and configured to contain a modulus, and
      data transfer logic associated with said modulus register and configured to transfer data from at least one memory location in said slave device to said I2C bus based on said modulus and a starting address and at least one acknowledgement signal received from said master device;
      wherein a nonzero positive integer modulus defines the number of memory locations in a closed-ended range of memory locations, said starting address defines a starting address for said close-ended range and said data transfer logic repeatedly loops through memory locations in said closed-ended range to transfer data from each of the memory locations in said closed-ended range to said I2C bus a plurality of times based on said at least one acknowledgement signal and wherein a modulus of zero defines an open-ended range of memory locations, said starting address defines a starting address for said open-ended range and said data transfer logic transfers data from each of the memory locations in said open-ended range to said I2C bus only a single time based on said at least one acknowledgement signal.

10. The electronic assembly as recited in claim 9 wherein said modulus is received from said master device.

11. The electronic assembly as recited in claim 10 wherein said modulus is received via said I2C bus before said starting address is received via said I2C bus.

12. The electronic assembly as recited in claim 9 wherein said modulus register shares a common slave address with said slave device.

* * * * *